United States Patent
Maeda et al.

[11] Patent Number: 5,188,420
[45] Date of Patent: Feb. 23, 1993

[54] GUIDE RAIL DEVICE OF SUN-ROOF

[75] Inventors: Kenji Maeda, Kariya; Kenichiro Hayashi, Okazaki; Mitsuyoshi Masuda, Nagoya; Hirofumi Nishikawa, Okazaki; Katsuhiro Suzuki, Aichi, all of Japan

[73] Assignee: Aisin Seiki Kabushiki Kaisha, Kariya, Japan

[21] Appl. No.: 813,542

[22] Filed: Dec. 26, 1991

[30] Foreign Application Priority Data

Dec. 28, 1990 [JP] Japan ................................. 2-402692

[51] Int. Cl.⁵ ............................................. B60J 7/057
[52] U.S. Cl. ..................................... 296/223; 296/216
[58] Field of Search ........................ 296/213, 216, 223

[56] References Cited

U.S. PATENT DOCUMENTS 3,290,087  12/1966  Werner ........................... 296/223 X
4,671,565   6/1987  Grimm et al. ........................ 296/216

FOREIGN PATENT DOCUMENTS 264667   9/1963  Australia .............................. 296/223
1180630  10/1964  Fed. Rep. of Germany ...... 296/223

Primary Examiner—Dennis H. Pedder
Attorney, Agent, or Firm—Finnegan, Henderson, Farabow, Garrett & Dunner

[57] ABSTRACT

A guide rail device of a sun-roof comprises a guide rail portion formed into a U-shaped configuration and including a first lengthwise portion, a second lengthwise portion which is in parallel therewith, a connecting portion provided between each of ends of the first and second lengthwise portions so as to be perpendicular thereto, a first corner for the connection of both the first lengthwise portion and the connecting portion, and a second corner for the connection of both the second lengthwise portion and the connecting portion, a pair of continuous guide groove device formed in the guide rail portions for guiding shoe device on which a roof panel is mounted, and an upstanding wall provided at each corner in such a manner that the wall is outside of the sliding range of each of shoes which are moved by the cables.

4 Claims, 4 Drawing Sheets

GUIDE RAIL DEVICE OF SUN-ROOF

BACKGROUND OF THE INVENTION

1. Field of the Invention

The present invention relates to a guide rail device of a sun-roof for use in an automotive vehicle.

2. Description of the Related Art

A conventional guide rail device of a sun-roof related to the present invention is disclosed in U.S. Pat. No. 4,671,565. In the conventional guide rail device of a sun roof, a guide rail portion is formed into a U-shaped configuration and a pair of horizontally opposed guiding portions are continuously formed in the guide rail portion for uniform cross-section.

However, both of the guiding portions are formed so as to have an opening space in the lengthwise direction. This results in that the rigidity of the guiding portions are decreased. Particularly in forming the corner portion of the guide rail by bending an aluminium extruded member, the guiding portions located at the corners are easy to be transformed. Thereby, the guiding portions located at the corners are easy to contact with the sliding cables, so that the sliding resistance of the cables located at each of the corners increases. Thus, it is dangerous for the cables to fail to slide.

SUMMARY OF THE INVENTION

It is, therefore, a primary object of the present invention to provide a guide rail device of a sun-roof without the foregoing drawbacks.

It is another object of the present invention to prevent the transformation Of the guiding portions The above and other objects are achieved by a guide rail device of a sun-roof according to the present invention which comprises a guide rail portion formed into a U-shaped configuration and including a first lengthwise portion, a second lengthwise portion which is in parallel therewith, a connecting portion provided between each of ends of the first and second lengthwise portions so as to be perpendicular thereto, a first corner for the connection of both the first lengthwise portion and the connecting portion, and a second corner for the connection of both the second lengthwise portion and the connecting portion; a pair of continuous guide groove means formed in the guide rail portions for guiding shoe means on which a roof panel is mounted; an upstanding wall provided at each corner in such a manner that the wall is outside of the sliding range of each of shoes which are moved by the cables.

BRIEF DESCRIPTION OF THE DRAWINGS

Additional objects and advantages of the present invention will become more apparent from the following detailed description of preferred embodiment thereof when considered with reference to the attached drawings, in which.

DETAILED DESCRIPTION OF THE PREFERRED EMBODIMENT

Figure 1:
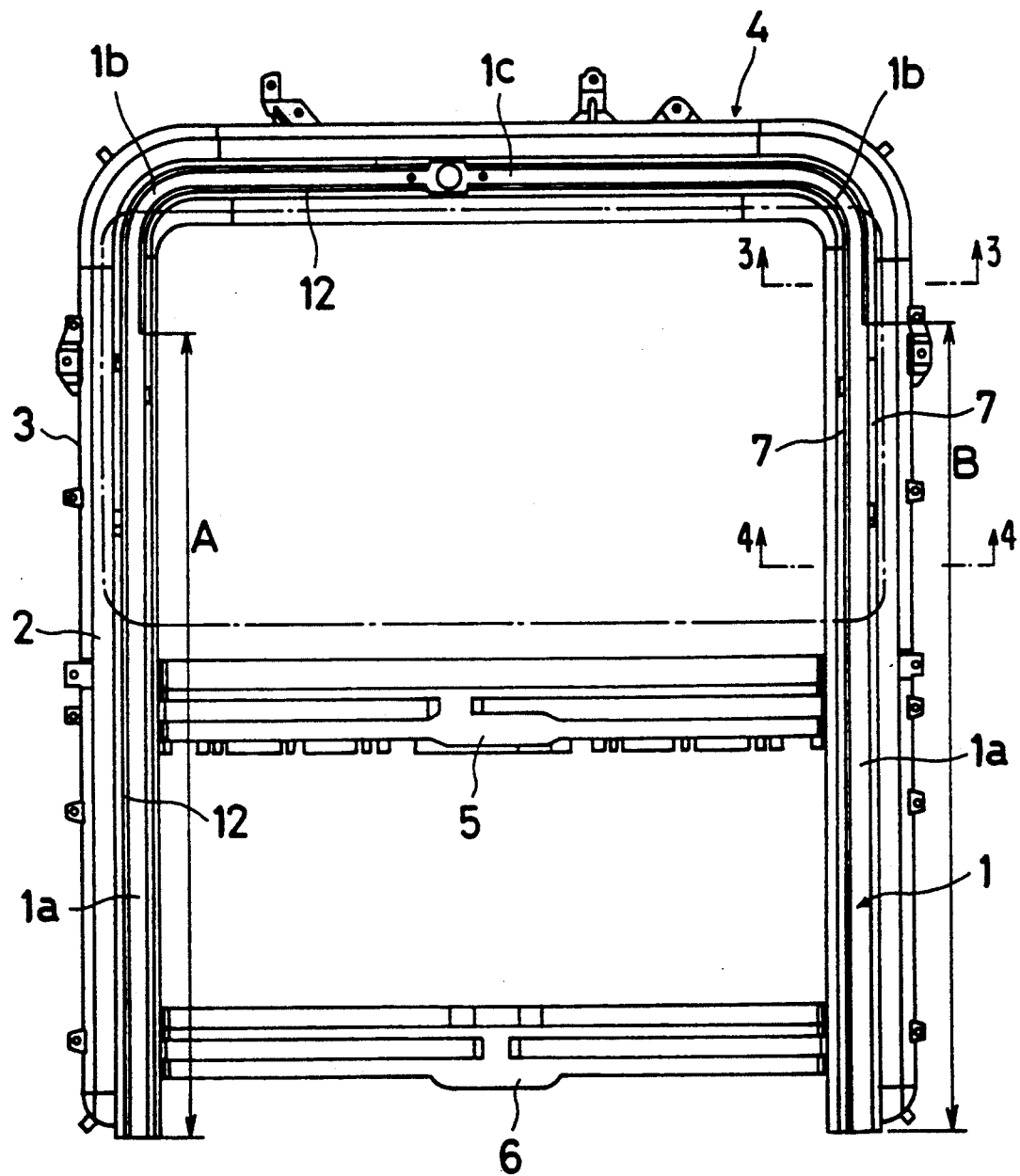
FIG. 1 is a plan view of a guide rail device of a sun-roof according to the present invention.

Referring to FIG. 1, a sun-roof housing 4 is formed into a U-shaped construction in plane by bending a length of an aluminium extruded member. The sun-roof housing 4 includes a guide rail portion 1, a gutter portion 2, and a flange portion 3. The guide rail 1 is formed integrally with both the gutter portion 2 and the flange portion 3 connected to the gutter portion 2. The guide rail 1 includes a first lengthwise portion 1a, a second lengthwise portion 1a which is in parallel therewith, a connected portion 1c provided at each of ends of the first and second lengthwise portions 1a, 1a so as to be perpendicular thereto, a first corner for 1b connecting to both the first lengthwise portion 1a and the connecting portion 1c, and a second corner 1b for connecting to both the second lengthwise portion 1a and the connecting portion 1c. Members 5 and 6 are used for reinforcing the sun-roof housing 4.

Figure 3:
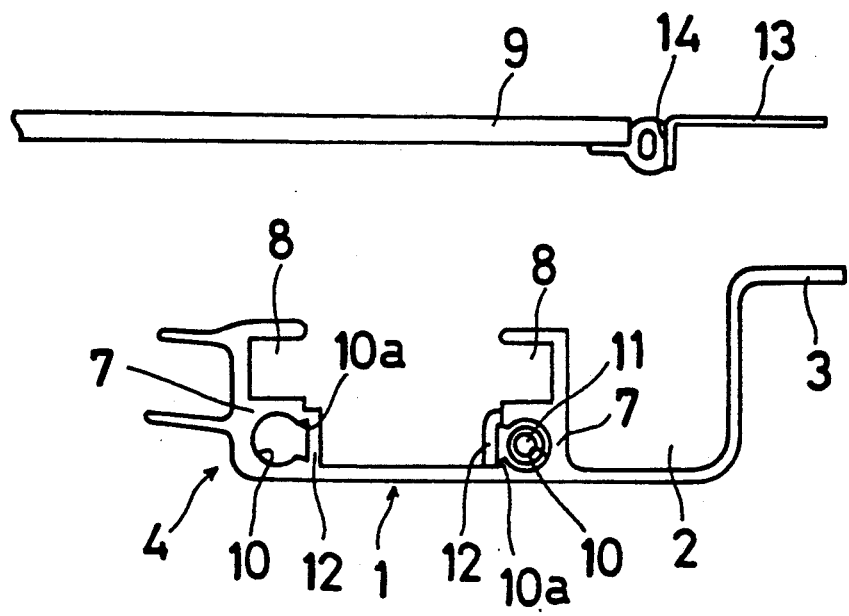
FIG. 3 is a cross-sectional view taken along line C—C in FIG. 1.
Figure 4:
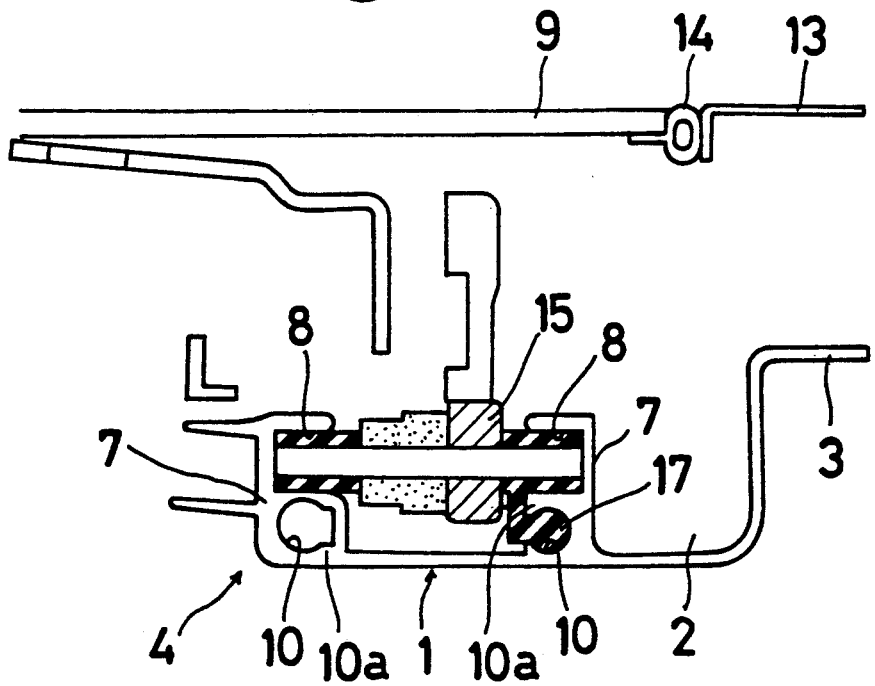
FIG. 4 is a cross-sectional view taken along line D—D in FIG. 1.
Figure 6:
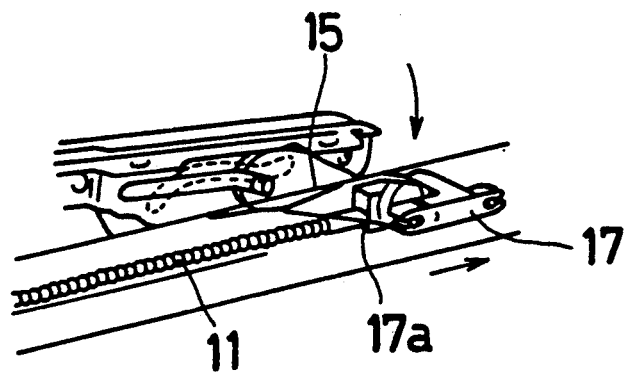
FIG. 6 is an enlarged perspective view of a connection of the drive to the guide shoe 17 in FIG. 2.

As shown in FIG. 3 and FIG. 4, the guide rail 1 is defined by a pair of laterally spaced side walls 7. A pair of horizontally opposed grooves 8 in the side walls 7 respectively are continuously formed from the first lengthwise portion 1a to the second lengthwise portion 1a via the first corner 1b, the connecting portion 1c, and the second corner 1b in the lengthwise direction. Referring to FIGS. 4, a link member 15 for mounting thereon a roof panel 9 of a sun-roof is pivoted to a shoe means 17 which is supported by the grooves 8, 8 so as to be slided therealong. A pair of horizontally opposed guiding portions or guide groove means 10 are continuously formed below each of the grooves 8, 8 of the side walls 7 in the lengthwise direction. A pair of cables 11 are slidably disposed in the guiding portions 10 respectively. One end of one of a pair of cables 11 is connected to a portion 17a of the shoe means 17 (shown in FIG. 6) and the other end of one of the cables 11 is in free end. One end of the other cable is in free end and the other end of the other cable is connected to the other shoe (not shown).

Figure 2:
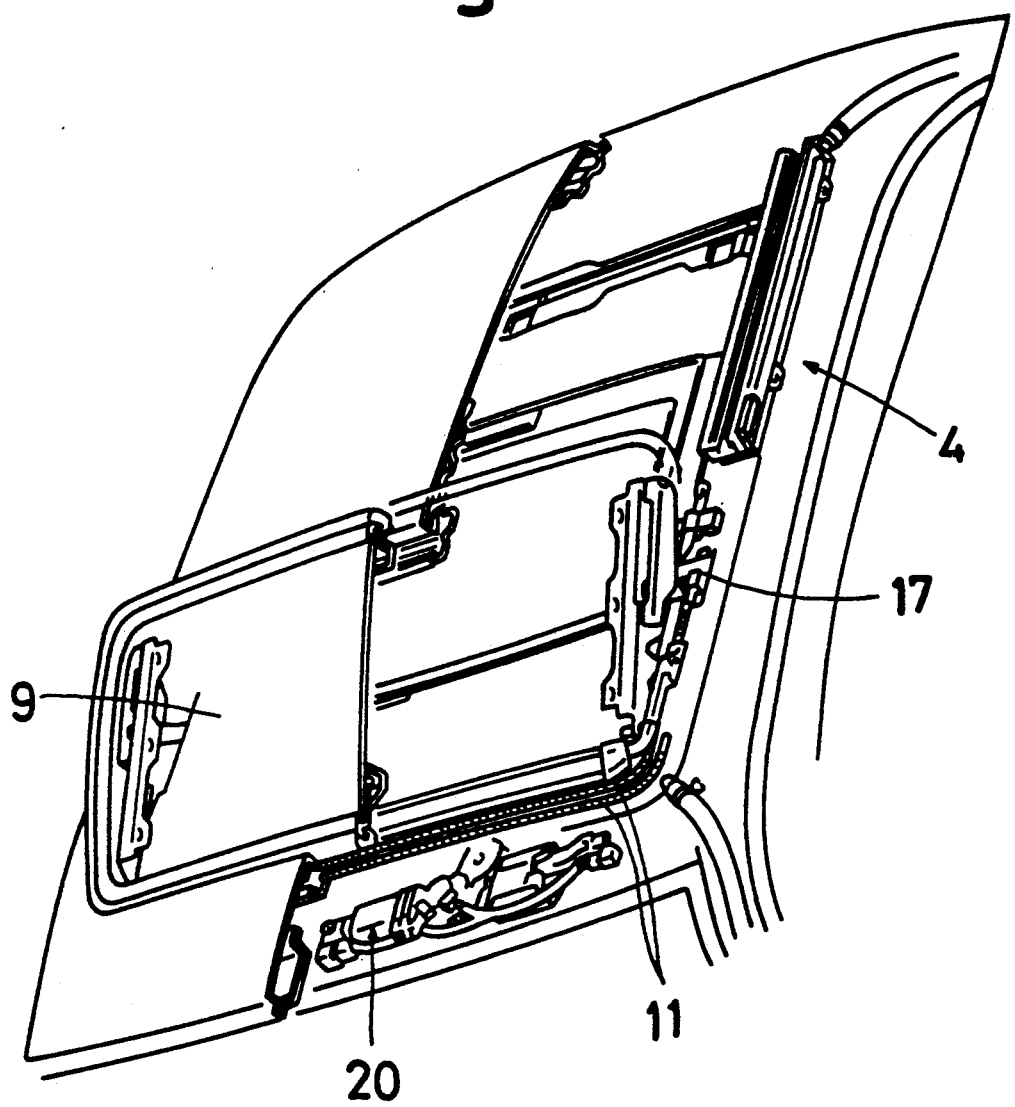
FIG. 2 is a perspective overview of a sun-roof in which a guide rail device of the present invention is installed.
Figure 5:
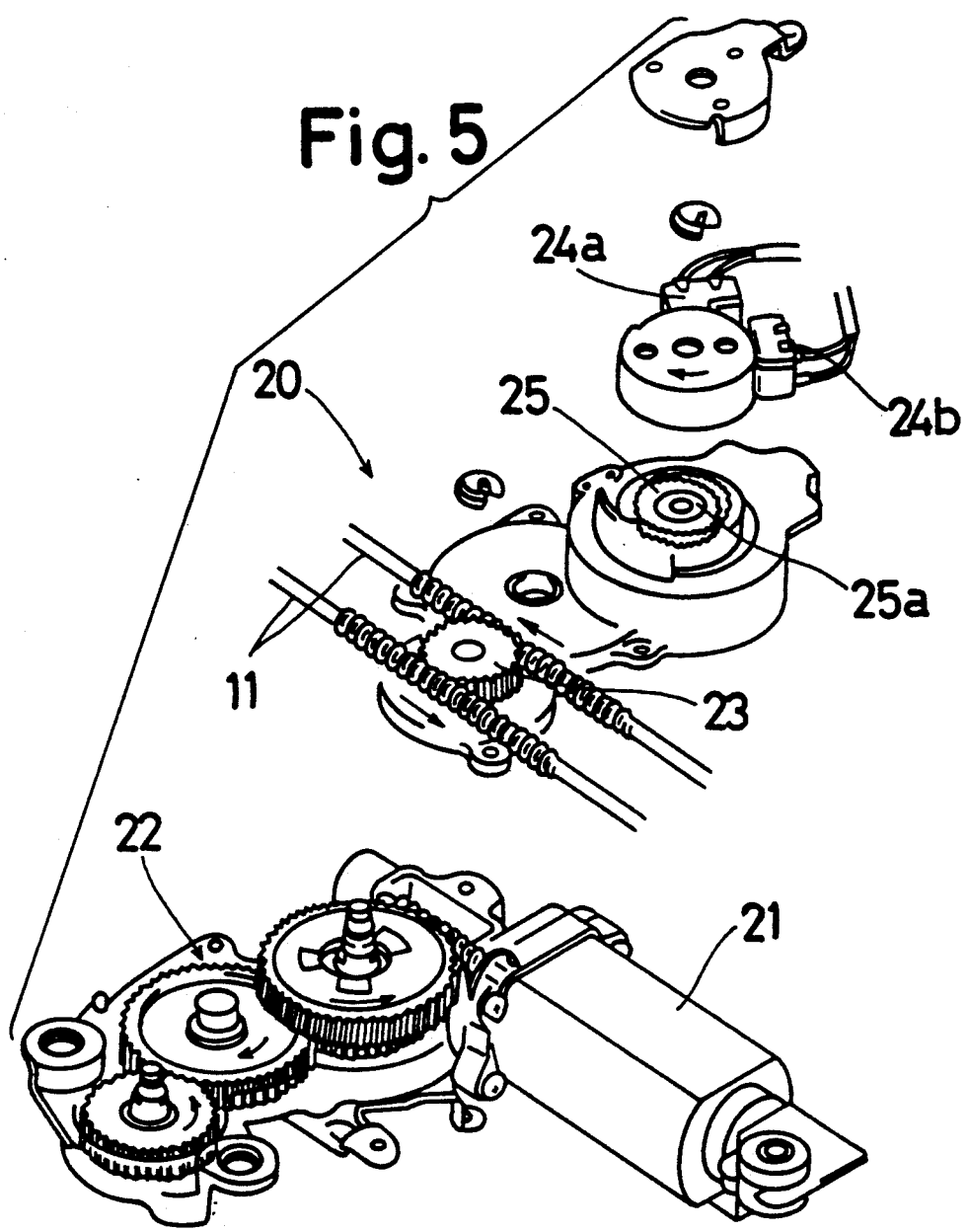
FIG. 5 is an enlarged exploded perspective view of a drive mechanism generally designated by the reference numeral 20 in FIG. 2.

As shown in FIGS. 2 and 5, a driving mechanism 20 is used for driving the roof panel 9. The driving mechanism 20 includes a motor 21. The motor 21 is operatively connected, via a reducing mechanism 22, to a driving gear 23 which is in mesh engagement with both of the cables 11 and 11 for the movements thereof in opposite directions. The shoes means 17 and 17 are set to slide in the same lengthwise directions due to the movements of the cables 11 and 11 in the opposite directions. The moving range of the roof panel 9 is defined by a pair of limit switches 24a and 24b each of which is set to be turned on when a pin 25a of a gear 25 is brought into engagement therewith. That is to say, if the pin 25a is brought into contact with the limit switches 24a (24b), the cables 11 are set to be stopped which are moved for opening (closing)the roof panel 9. The limit switches 24a, 24b are electrically connected to a controller (not shown) in order that the retracted or closed position and the fully opened position of the roof panel 9 can be detected by the controller. The controller is set to control the rotation of the motor 21 based on the turning-on of each of the limit switches 24a, 24b.

Referring back to FIGS. 3 and 4, a pair of tapered portions 10a are formed at opening periphery of each guiding portion 10. A pair of upstanding walls 12 are formed integrally with the guiding portions 10 so as to close the opening thereof except for portions whose length is indicated by A or B in FIG. 1 along which each of the shoes 17 is set to be slided. Thus, as shown in FIG. 2, both of the guiding portions 10 are continuously formed so as to have a pair of closed spaces from the first lengthwise portion 1a to the second lengthwise portion 1a via the first corner 1b, the connecting portion 1c, and the second corner 1b except for the foregoing distance A or B . As shown in FIG. 3, on the contrary, one of the guiding portions 10 is formed so as to have a closed space and the other 10 is formed so as to have a opening space in the foregoing distance A or B Thus constructed sun-roof housing 4 is fixed to a vehicle roof 13. Thereby, an opening portion 14 formed in the vehicle roof 13 is opened/closed by the movement of the roof panel 9 supported by the shoe means 17 via the link member 15.

Thus, the present invention enables the improvement of the rigidity of the guiding portions 10 due to the establishment of the upstanding wall 12 on the guiding portions 10. Particularly, in forming the corner portions 1b of the guide rail 1 by bending an aluminium extruded member, the guiding portion 10 located at each corner 1b is difficult to be transformed. Thereby, the guiding portion 10 located at each corner 1b is difficult to contact with the sliding cables 11, so that the sliding resistance of the cables 11 located at the corners 1b is reduced. This results in that the cables 11 can slide smoothly.

Further, since one of the upstanding walls 12 is removed in the portions indicated by A or B in FIG. 1, the shoe means 17 can slide smoothly, so that the roof panel 9 can move smoothly.

Further, even if a plurality of burrs are generated in removing each of the upstanding walls 12, the bares are difficult to contact with the cables 11 or the shoes 17 due to the tapered portions 10a formed at opening periphery of each guiding portion 10.

Obviously, numerous modifications and variations of the present invention are possible in light of the above teaching. It is therefore to be understood that the scope of the appended claims, the invention may be practiced otherwise than as specifically described herein.

What is claimed is:

1. A guide rail device for a sun-roof and formed by an extruded metal member bent into a U-shaped configuration and cut at one or more portions thereof, said device comprising:

a metal guide rail having a U-shaped configuration to establish a first longitudinal portion, a second longitudinal portion, a connecting portion perpendicular to the first and second longitudinal portions, a first corner portion for connecting one end of the first longitudinal portion and one end of the connecting portion, and a second corner portion for connecting one end of the second longitudinal portion and the other end of the connection portion;

a pair of mutually opposed continuous shoe grooves in each of first and second longitudinal portions for slidably receiving a roof panel supporting shoe member; and a pair of mutually opposed continuous guide conduits positioned below the corresponding shoe grooves, each of said guide conduits having a pair of tapered portions diverging in the direction of the other of the pair of guide conduits and ending in an upstanding closure wall, one guide conduit receiving a portion of the slidable shoe member and a cable connected thereto, the upstanding closure wall of said one guide conduit being cut out along a sliding range of the shoe.

2. A guide rail device according to claim 1 wherein the metal guide rail is aluminum.

3. A guide rail device for a run-roof and formed by an extruded metal member bent into a U-shaped configuration and cut at one or more portions thereof, said device comprising:

a metal guide rail having a U-shaped configuration to establish a first longitudinal portion, a second longitudinal portion, a connecting portion perpendicular to the first and second longitudinal portions, a first corner portion for connecting one end of the first longitudinal portion and one end of the connecting portion, and a second corner portion for connecting one end of the second longitudinal portion and the other end of the connecting portion; and a pair of mutually opposed continuous guide conduits for guiding a roof panel supporting slidable shoe member, each of said guide conduits having a pair of tapered portions diverging in the direction of the other of the pair of guide conduits and ending in an upstanding closure wall, one guide conduit receiving a portion f the slidable shoe member and a cable connected thereto, the upstanding closure wall of said one guide conduit being cut out along a sliding range of the shoe, the other guide conduit being closed by the upstanding closure wall thereof for the sliding range of the shoe having a portion received in said one guide conduit.

4. A guide rail device according to claim 3 wherein the metal guide rail is aluminum.

* * * * *

UNITED STATES PATENT AND TRADEMARK OFFICE
CERTIFICATE OF CORRECTION

PATENT NO. : 5,188,420

DATED : February 23, 1993

INVENTOR(S) : Kenji MAEDA et al.

It is certified that error appears in the above-identified patent and that said Letters Patent is hereby corrected as shown below:

Claim 3, column 4, line 25, change "run-roof" to --sun-roof--; and line 46, change "f" to --of--.

Signed and Sealed this

Seventh Day of December, 1993

Attest:

BRUCE LEHMAN

Attesting Officer

Commissioner of Patents and Trademarks